June 11, 1968 R. W. RYNBERK 3,387,786
DIVIDER AND SPRINKLER COMBINATION
Filed Jan. 17, 1967 2 Sheets-Sheet 2
FIG. 4
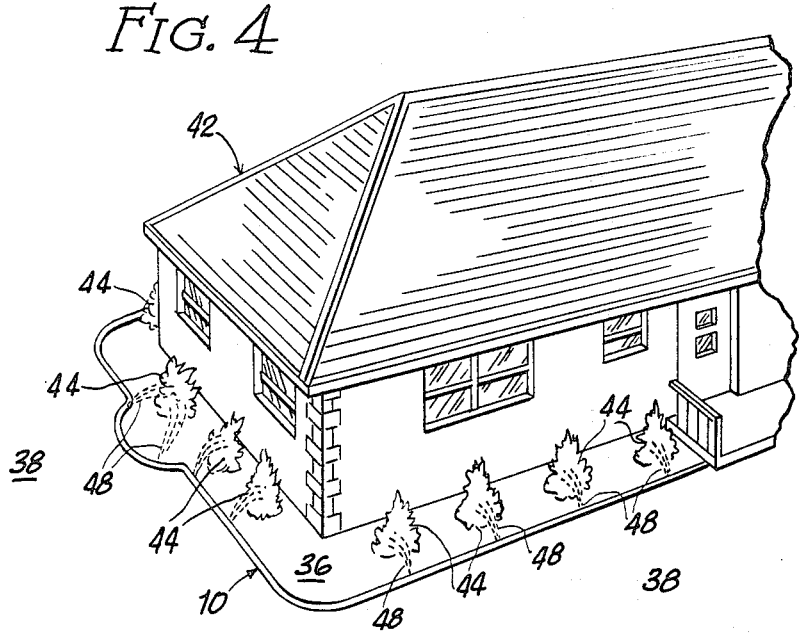
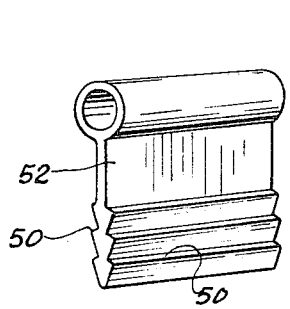
FIG. 5
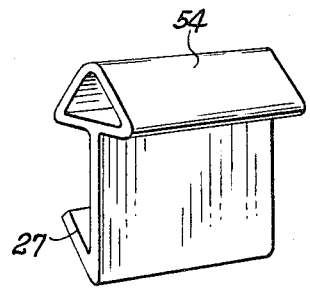
FIG. 6
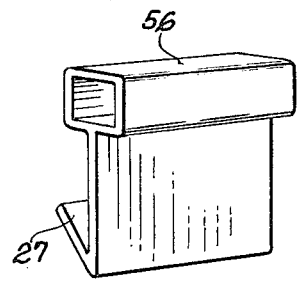
FIG. 7
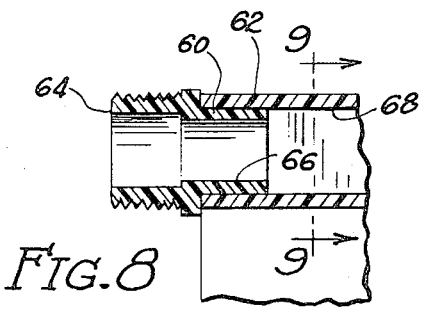
FIG. 8
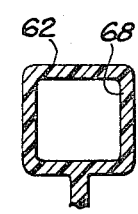
FIG. 9
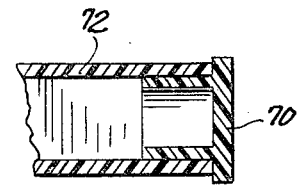
FIG. 10
INVENTOR
Robert W. Rynberk
by McDougall, Hersh, Scott
and Ladd
Att'ys United States Patent Office 3,387,786
Patented June 11, 1968

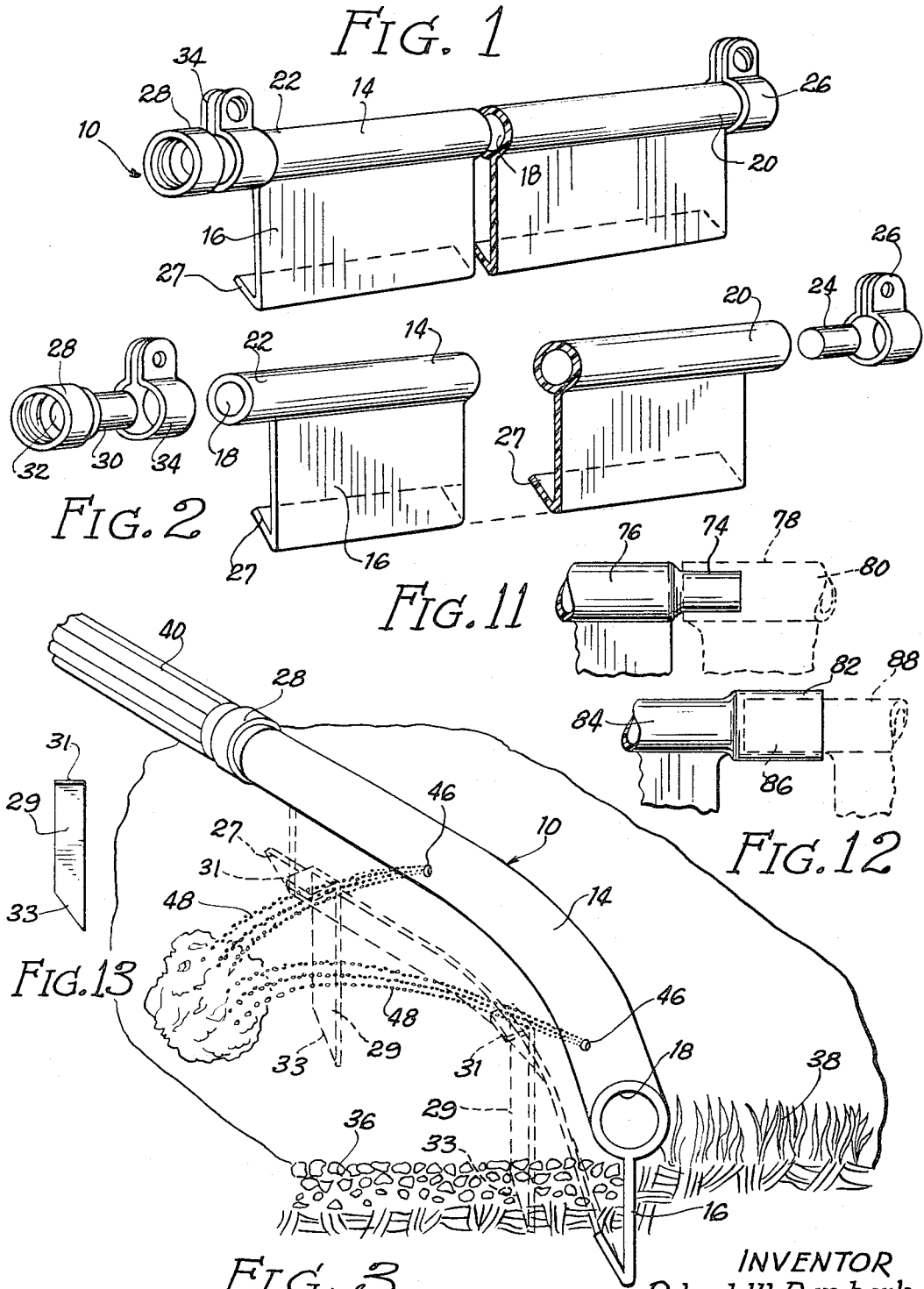

3,387,786
DIVIDER AND SPRINKLER COMBINATION
Robert W. Rynberk, 4347 W. 109th St.,
Oak Lawn, Ill. 60453
Continuation-in-part of application Ser. No. 450,663,
Apr. 26, 1965. This application Jan. 17, 1967, Ser.
No. 609,818
8 Claims. (Cl. 239—201)

ABSTRACT OF THE DISCLOSURE

A divider for landscaping including a water conducting upper section with openings for sprinkling water on the ground, and including means for connecting several sections together. A downwardly extending flange is formed along the length of the upper section and projecting means may be associated with the lower edge of the flange to facilitate securing of the divider in the ground. The flange serves as a barrier to the growth of grass roots and the like beyond the divider.

---

This application is a continuation-in-part of applicant's application Ser. No. 450,663, filed Apr. 26, 1965, now abandoned.

This invention relates to a construction adapted to be employed in landscaping. In particular, the invention is concerned with a divider construction adapted to be employed for dividing a lawn or other area from another area such as a flower bed. The divider of this invention is characterized by means for sprinkling of the area around the divider to provide for a unique operating combination.

The use of dividers for landscaping purposes is well known. In most instances, dividers are formed of wood, concrete or metal. Wood dividers are considered unsightly and bulky and they require relatively frequent painting. In addition, they must be replaced periodically due to the fact that they will readily rot under most conditions.

Metal dividers are subject to corrosion, and they can also be readily bent or otherwise damaged, particularly when struck by mowers, edgers, spreaders, wheelbarrows or other lawn care equipment. Thin sheet metal dividers are also a hazard because they present relatively sharp cutting edges. Concrete dividers are satisfactory in most cases from a performance standpoint; however, the installation of such dividers is prohibitively expensive in most cases.

Even where suitable dividers are employed, difficulties arise when attempts are made to spray water in areas enclosed by the dividers. The use of a hose or portable sprinklers usually results in the waste of a large amount of water. Accidental wetting of the walls of a house or other building adjacent the bed can result in discoloration, particularly where the water employed has a relatively high mineral content.

The instant invention is directed to elimination of various problems encountered when employing dividers. The invention is concerned with operations which involve the use of gravel beds which are commonly formed outside the walls of a building to catch water dripping from the eaves. Such beds eliminate damage to the sod and they avoid the splashing of mud on the sides of the building. Shrubbery is often planted within the beds to suit landscaping plans. Dividers are preferably employed in such arrangements since they reduce the amount of displacement of gravel onto grass areas and they prevent the growth of grass into the gravel. It will be understood that the invention is also directed to divider structures which can be employed for separating areas including areas which do not necessarily comprise gravel beds or grass.

It is an object of this invention to provide an improved divider structure which includes sprinkler mechanisms whereby the divider is adapted to eliminate problems which characterize prior art dividers.

It is a more particular object of this invention to provide a divider structure which can be readily formed from durable materials and which can be readily associated with a sprinkler system.

It is a further object of this invention to provide a divider construction which is relatively simple in design whereby the construction can be economically produced and efficiently employed.

These and other objects of this invention will appear hereinafter and for purposes of illustration but not of limitation, specific embodiments of this invention are shown in the accompanying drawings in which:

FIGURE 1 is a perspective view of a divider structure characterized by the features of this invention;

FIGURE 2 is an exploded view of the structure of FIGURE 1;

FIGURE 3 is a detail perspective view illustrating the incorporation of the structure into the ground;

FIGURE 4 is a perspective view illustrating the use of the structure on a landscape;

FIGURES 5, 6 and 7 comprise perspective views of alternative designs for the divider structure;

FIGURE 8 is a vertical sectional view illustrating a hose coupling member adapted to be associated with the structure;

FIGURE 9 is a cross-sectional view taken about the line 9—9 of FIGURE 8;

FIGURE 10 is a horizontal sectional view illustrating a plug associated with the structure for closure of one end thereof;

FIGURE 11 is a fragmentary view illustrating an alternative coupling arrangement for the divider structure;

FIGURE 12 is a fragmentary view of an additional alternative coupling arrangement for the divider structure; and, FIGURE 13 illustrates a metal stake used for securing divider sections in the ground.

The construction of this invention generally comprises an upper section which defines a central passage. A plurality of sprinkler openings are formed in the upper section, and these openings communicate with the central passage whereby water is adapted to be passed through the passage and out of the openings for sprinkling of the water onto areas adjacent the divider.

The divider construction also includes downwardly extending members which provide for incorporation of the divider with the ground. Such members preferably comprise a continuous flange whereby a barrier between a gravel bed and the grass will be provided. This flange is preferably integrally formed with the divider to provide for efficient manufacturing procedures. A V-shaped extension associated with the flange provides an ideal means for securing the divider with stakes.

In the drawings, FIGURE 1 illustrates a divider 10 which includes an upper section 14 and a flange 16 extending downwardly therefrom. The upper section defines a central passage 18 terminating in ends 20 and 22. As best shown in FIGURE 2, a plug member 24 is provided for the end 20, and a clamp 26 fits around the end 20 whereby the end can be squeezed for securing the plug member in place. An elongated plug can also be used to join two adjacent sections if water circulation between the sections is not desired.

A lip 27 is formed integrally with the flange 16 to form a V-shaped configuration along the bottom edge of the divider. Stakes 29 shown in FIGURES 3 and 13 can be driven through this V-shaped section for securing each divider section in place.

A hose coupling member 28 is located at the other end 22 of the section 14. The coupling includes a stem 30 which defines a central opening 32. The stem fits into the passage 18, and clamp member 34 holds the hose coupling in engagement with the divider.

The use of a divider structure of the type shown in FIGURES 1 and 2 is best illustrated in FIGURES 3 and 4. As noted, the flange 16 extends into the ground whereby the upper section 14 is located just above the ground level. The flange 16 provides a barrier between the gravel bed 36 and the lawn area 38. A hose 40 is attached by means of the coupling 28 whereby water is adapted to be passed through the divider construction.

The divider sections are preferably put into position by first forming a narrow trench with a spade. When the sections are located, the stakes 29 are driven in until the flange portion 31 engages the upper edge of lip 27. It will be noted that the stakes define pointed ends 33 to facilitate driving through the divided material and into the ground.

The divider 10 is adapted to extend around a building such as the house 42 shown in FIGURE 4. The lawn area 38 is thus completely separated from the gravel bed area 36. The barrier provided by the flange 16 is designed to effectively prevent the grass from growing into the gravel area.

Shrubs 44 are located in the gravel area for landscaping purposes, and these shrubs are adapted to be sprinkled through the use of the divider construction of this invention. It will be noted that openings 46 are formed in the section 14 of the divider, and these openings provide for the passage of water from the section 14 in the form of streams 48. In accordance with a preferred aspect of this invention, the openings 46 are formed in the divider in accordance with a selected pattern, depending on the location of the shrubs. It will be appreciated that such openings could be initially formed in the manufacture of the dividers; however, the instant invention preferably provides for formation of the openings after the divider construction is in place.

FIGURES 5, 6 and 7 illustrate alternative designs for the divider construction. In the arrangement of FIGURE 5, ridges 50 are defined by the flange portion 52 whereby the divider construction can be held securely in place in the ground.

In the arrangements of FIGURES 6 and 7, the upper sections 54 and 56 define triangular and rectangular cross sections, respectively. It will be appreciated that a wide variety of designs from the standpoint of cross section of the dividers are available.

In the preferred form of this invention, the divider comprises an extrusion formed of a thermoplastic material. Polyethylene or polyvinyl combinations provide examples of suitable materials although other materials are available. One advantage of such materials relates to their semi-plastic state after formation whereby the dividers can be arranged around corners and in various patterns. In addition, the materials can be colored to provide a desired color scheme. Finally, metal stakes can be driven through such material without difficulty.

FIGURES 8 and 9 illustrate the inclusion of an adaptor member 60 in a divider 62 of non-circular cross section. This adaptor includes a circular end portion 64 for attachment to a hose, and it defines a rectangular shank portion 66 for insertion into the rectangular interior 68 of the divider 62.

In FIGURE 10, there is illustrated an alternative arrangement for associating a plug 70 with a divider 72. It will be appreciated that the plug could be friction fit with respect to the divider or a clamp such as shown in FIGURES 1 and 2 could also be employed.

FIGURE 11 illustrates one contemplated alternative arrangement for the practice of this invention. In this system, the end 74 of the upper section 76 of a divider is necked down whereby this end will interfit with the end 78 of the upper section 80 of an adjacent divider. FIGURE 12 illustrates another alternative arrangement wherein the end 82 of upper section 84 receives in telescoping relationship the end 86 of upper section 88. In each of these arrangements, lengths of dividers can be connected together where a particularly long distance is to be covered by the dividers. Communication between the respective central passages of the dividers can be readily achieved.

There has been described a divider construction which eliminates the various problems which characterize prior art divider constructions. The constructions of this invention can be manufactured by highly efficient extrusion techniques from materials which are relatively inexpensive and extremely durable from the standpoint of other systems. The invention is particularly valuable in that a sprinkler system is directly incorporated therein without any great problems arising from the standpoint of manufacturing difficulty, installation or use. All of the elements of the invention including the coupling mechanisms can be readily employed by relatively unskilled personnel from the standpoint of installation and use.

It will be obvious that the characteristics of the construction disclosed make the construction useful as a divider even if a sprinkler connection is not made. The design is desirable in this respect since it can be economically produced and is extremely easy to handle, particularly when locating the divider in patterns which require curves in the divider. Finally, the design is quite satisfactory from the standpoint of appearance.

It will be understood that various changes and modifications may be made in the construction of this invention which provide the characteristics of this invention without departing from the spirit thereof particularly as defined in the following claims.

That which is claimed is:

1. A divider assembly for landscaping comprising a plurality of interconnected divider sections for defining the limits of a landscaped plot, each of said divider sections comprising an extruded length of plastic including an enlarged upper section defining a central passage, means for attaching an upper section of one divider section to an upper section of an adjacent divider section whereby the assembly consists of a plurality of interconnected sections, and an integrally formed downwardly extending flange means having a vertical dimension substantially greater than the vertical dimension of said upper section, said flange means adapted to be substantially completely inserted in the ground whereby the upper section is located immediately above the top surface of the ground while said flange means acts as a barrier to the growth of grass roots and the like into said plot, said downwardly extending flange means comprising a relatively narrow portion extending substantially completely along the length of said upper section, and including outwardly projecting portions attached to said flange means adjacent the bottom edge thereof to assist in securing said flange means in place.

2. A divider assembly for landscaping comprising a plurality of interconnected divider sections for defining the limits of a landscaped plot, each of said divider sections comprising an extruded length of plastic including an enlarged upper section defining a central passage, and an integrally formed downwardly extending flange means adapted to be inserted in the ground whereby the upper section is located immediately above the top surface of the ground, said downwardly extending flange means comprising a relatively narrow portion extending substantially completely along the length of said upper section, an upturned lip formed integrally along the bottom edge of the flange of each divider section, and wherein stakes are driven through the juncture formed by said lip and flange to thereby provide for the securing of the divider assembly to the ground.

3. A divider for landscaping comprising an extruded length of plastic including an elongated upper section defining a central passage, a plurality of sprinkler outlet openings defined by said upper section and communicating with said passage, hose coupling means associated with said upper section for attaching a source of water to said upper section for passing water through said passage and for passing the water out of said outlet openings, and including a downwardly extending flange formed integrally with said upper section for insertion in the ground whereby said upper section is adapted to be located immediately above the top surface of the ground, said flange extending along the length of said upper section and including an upturned lip formed integrally with the bottom of the flange, and stakes driven through the juncture formed by said lip and flange for securing the divider to the ground.

4. A divider in accordance with claim 3 wherein said hose coupling is removably attached to said divider.

5. A divider in accordance with claim 3 wherein said hose coupling is removably attached at one end of said divider and including a plug member at the other end of said divider to prevent the passage of water out of said other end of the divider.

6. A divider in accordance with claim 5 wherein said hose coupling and plug member are adapted to be clamped in place on said upper section.

7. A divider in accordance with claim 3 wherein one end of said upper section comprises a necked down extension for interfitting in telescoping relationship with an adjacent divider whereby separate lengths of dividers can be assembled.

8. A divider in accordance with claim 3 wherein one end of said lupper section comprises a larger diameter extension for interfitting in telescoping relationship with an adjacent divider whereby separate lengths of dividers can be assembled.

References Cited

UNITED STATES PATENTS

| 144,055 | 10/1873 | Brown | 239—202 |
| 2,757,962 | 8/1956 | MacLeod | 239—276 |
| 2,909,328 | 10/1959 | Babyak | 239—268 |
| 3,091,401 | 5/1963 | Hruby | 239—276 |

FOREIGN PATENTS 1,422,293  11/1965  France.

M. HENSON WOOD, Jr., *Primary Examiner.*

H. NATTER, *Assistant Examiner.*